United States Patent [19]

Yeh

[11] Patent Number: 5,132,842
[45] Date of Patent: Jul. 21, 1992

[54] OPTICAL IMAGE TRANSFORMATION SYSTEM

[75] Inventor: Pochi A. Yeh, Thousand Oaks, Calif.

[73] Assignee: Rockwell International Corporation, Seal Beach, Calif.

[21] Appl. No.: 383,954

[22] Filed: Jul. 21, 1989

[51] Int. Cl.⁵ .............. G02B 27/42; G06E 3/00; G06K 9/32

[52] U.S. Cl. .............. 359/561; 359/107; 364/822; 382/42; 382/45; 382/46; 382/47

[58] Field of Search .............. 350/514–578, 350/96.13, 162.12–162.15, 321; 372/700–704, 108, 109, 96, 94, 25, 29, 2, 9, 20; 356/350, 392–397; 382/41–48, 65, 69; 359/29–34, 107, 559–564, 639–640; 364/815–826

[56] References Cited

U.S. PATENT DOCUMENTS

| | | | |
|---|---|---|---|
| 4,011,523 | 3/1977 | Hansell et al. | 372/94 |
| 4,277,137 | 7/1981 | Upatnieks et al. | 350/162 SF |
| 4,414,684 | 11/1983 | Blonder | 382/65 |
| 4,426,663 | 1/1984 | Evans et al. | 356/352 |
| 4,429,393 | 1/1984 | Giuliano | 372/94 |
| 4,618,991 | 10/1986 | Tasata et al. | 382/46 |
| 4,637,056 | 1/1987 | Sherman et al. | 382/31 |
| 4,651,297 | 3/1987 | Schlunt | 364/822 |
| 4,655,588 | 4/1987 | Chenausky et al. | 372/94 |
| 4,695,973 | 9/1987 | Yu | 350/162.13 |
| 4,731,788 | 3/1988 | Shoshan | 372/9 |
| 4,799,780 | 1/1989 | Bernard et al. | 350/600 |

Primary Examiner—Rodney B. Bovernick
Assistant Examiner—Thong Nguyen
Attorney, Agent, or Firm—John C. McFarren

[57] ABSTRACT

An optical system is provided for the transformation of input images to be correlated by a pattern recognition system. A pulse of light from a laser carries an input image to a beam splitter. The beam splitter divides the input pulse into an output pulse and a thoughput pulse that is directed through an optical ring resonator. The ring resonator is an optical reimaging system that transforms the input image in scale or orientation. The transformed version of the input image is then directed to the beam splitter where it is split into a modified output pulse and a modified throughput pulse that reenters the ring resonator. The transformation process is self-repeating to generate a series of successively modified output images that are equally spaced in time. The series of output images can be provided to an optical pattern recognition system for correlation with a stored reference. The generation of successive transformations of the input image precludes the necessity of storing a large library of reference images to be matched with the input image.

9 Claims, 2 Drawing Sheets

OPTICAL IMAGE TRANSFORMATION SYSTEM

TECHNICAL FIELD

The present invention relates to optical pattern recognition systems and, in particular, to an optical ring resonator that transforms an input image into a series of similar images having various sizes and orientations.

BACKGROUND OF THE INVENTION

In the field of optical pattern recognition, there is a need for simple and reliable devices that recognize specified optical patterns. Such devices are useful, for example, in industrial robots for distinguishing different physical objects, in photo-interpretation for automatically scanning for specific images, and in missile guidance systems for real-time target acquisition. In military and space applications, real-time image recognition is often needed in environments where a human observer cannot be present. In such remote environments, it is usually desirable that an image recognition system be small, light weight, and reliable.

For effective operation, optical pattern recognition systems generally require proper alignment of an input image with respect to a stored reference. Variations in orientation or size of the input image when compared to the on-board reference can lead to non-recognition of the image. Therefore, the adaptability of a system to variations in an input scene is a factor that can determine whether or not the pattern recognition process is successful. In dynamic or uncertain environments, correlation of input images that deviate in orientation or scale from a given reference continues to be a problem in pattern recognition systems.

Prior methods of pattern recognition designed to be invariant with transformations such as size and rotation have met with limited success. These prior methods range from the systematic extraction of pattern features to the common but inefficient technique of storing multiple rotated and scaled versions of the patterns to be recognized. The latter technique is useful in some situations, but it requires the storage of a vast quantity of necessarily redundant data. Thus, a need remains for an optical pattern recognition system that can perform reliable image correlations without the prior storage of a large library of redundant images.

SUMMARY OF THE INVENTION

The present invention comprises an optical device that transforms input images for correlation with reference images by an optical pattern recognition system. Instead of using a large library of stored images of various sizes and orientations as in the prior art, the present invention performs multiple transformations on an input image and compares the rotated and/or scaled versions of the input image with a single version of each reference image to be recognized.

In the present invention, a pulsed laser beam that carries an input image is directed into a ring resonator. The input pulse is split by a beam splitter to produce an output pulse and a throughput pulse. The throughput pulse is transformed by the ring resonator into a modified pulse that is a version of the input pulse transformed by a predetermined factor in orientation or scale, for example. The modified pulse is directed to the beam splitter to generate a modified output pulse and a modified throught pulse. This process is self-repeating to produce a series of successively modified output pulses equally spaced in time. The output pulses are separated by the travel time of the light through the ring resonator. The input optical pulse is shorter than the length of the ring resonator so the output images do not overlap.

The series of successively modified images output by the present invention can be correlated with a given reference image in an image recognition system. Because the output images exit the resonator at known intervals, the amount of modification of the input image can be determined by noting the time at which a correlation peak occurs.

BRIEF DESCRIPTION OF THE DRAWINGS

For a more complete understanding of the present invention and for further advantages thereof, the following Description of the Preferred Embodiment makes reference to the accompanying Drawings, in which.

DESCRIPTION OF THE PREFERRED EMBODIMENTS

Figure 1:
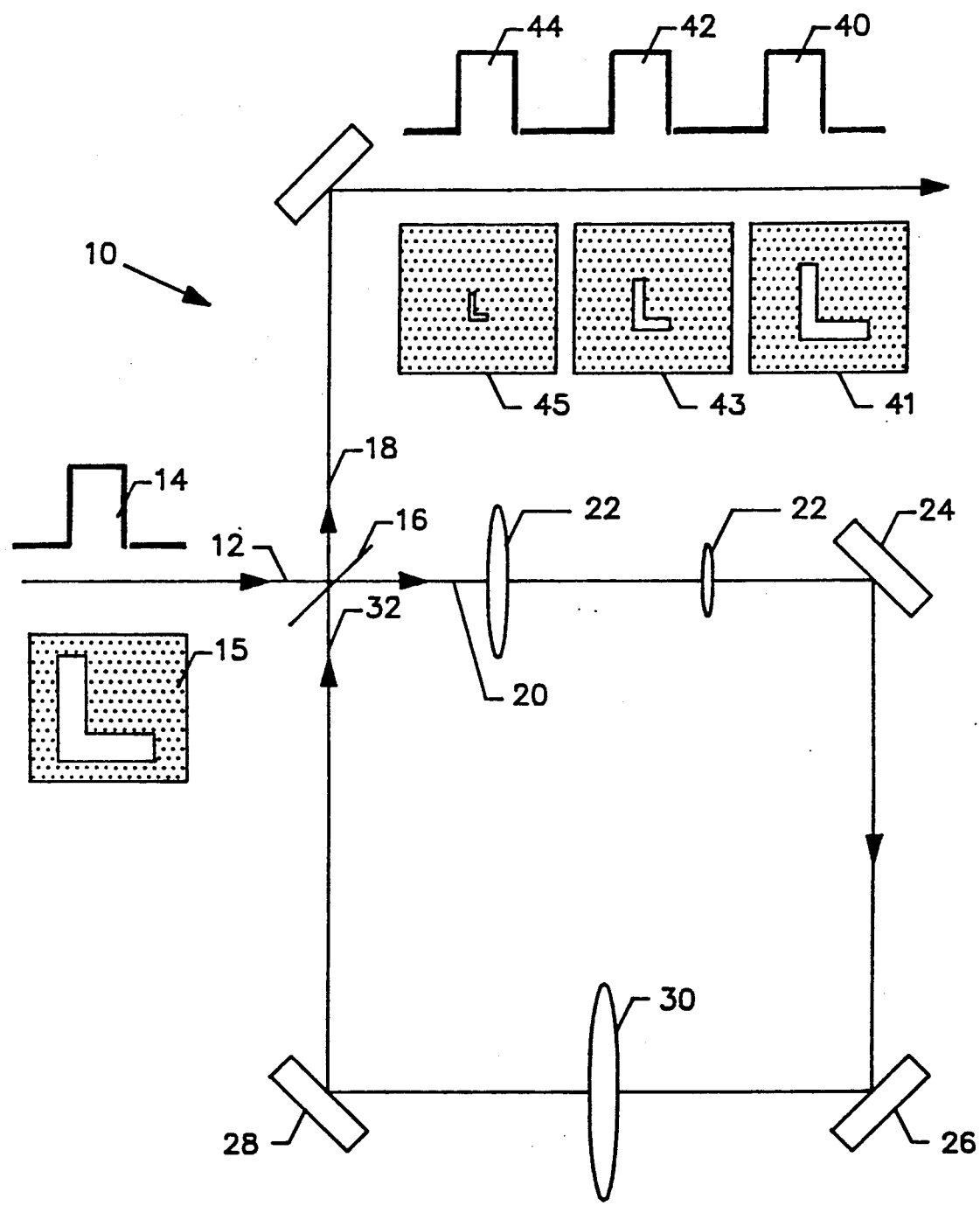
FIG. 1 is a schematic drawing of an optical ring resonator of the present invention for transforming the scale of an input image.

In optical pattern recognition systems, the correlation of an input image with a reference image is sensitive to factors such as the scale and orientation of the input image with respect to the reference. Instead of storing a library of references having variations in scale and orientation, the present invention uses an optical ring resonator to generate a series of successively modified input images to be compared with the reference. One embodiment of the present invention is illustrated in FIG. 1 and identified as ring resonator 10.

A pulsed laser beam 12 is input to ring resonator 10. Each pulse 14 of laser beam 12 carries an optical image 15. Input pulse 14 of laser beam 12 is directed onto a beam splitter 16 that splits input pulse 14 into an output pulse 18 and a throughput pulse 20. Pulse 20 is directed through an optical system, such as a demagnifying lens system 22, that modifies the scale of input image 15. Lens system 22 transforms pulse 20 into a modified pulse 32, which is directed by mirrors 24, 26, and 28 through an imaging lens 30 and onto beam splitter 16. Beam splitter 16 splits modified pulse 32 into a modified output pulse, identified as pulse 40, and a modified throughput pulse redirected through demagnifying lens system 22. This process repeats itself to generate successively modified output pulses, such as pulses 42 and 44. Output pulses 40, 42, and 44 are spaced by the travel time of pulse 20 through ring resonator 10. The length of input pulse 14 is less than the length of ring resonator 10 so that the output pulses do not overlap. Output pulses 40, 42, and 44 carry successively modified versions of input image 15, illustrated as images 41, 43, and 45, respectively. Output images 41, 43, and 45 are successively reduced versions of input image 15, each output image being reduced from the preceding image by a factor determined by demagnifying system 22. Thus, ring resonator 10 outputs a series of transformations of input image 15, with each output image modified from the preceding image by a predetermined factor. In addition, the output pulses are all spaced in time by a known constant determined by the travel time of light through resonator 10.

Figure 2:
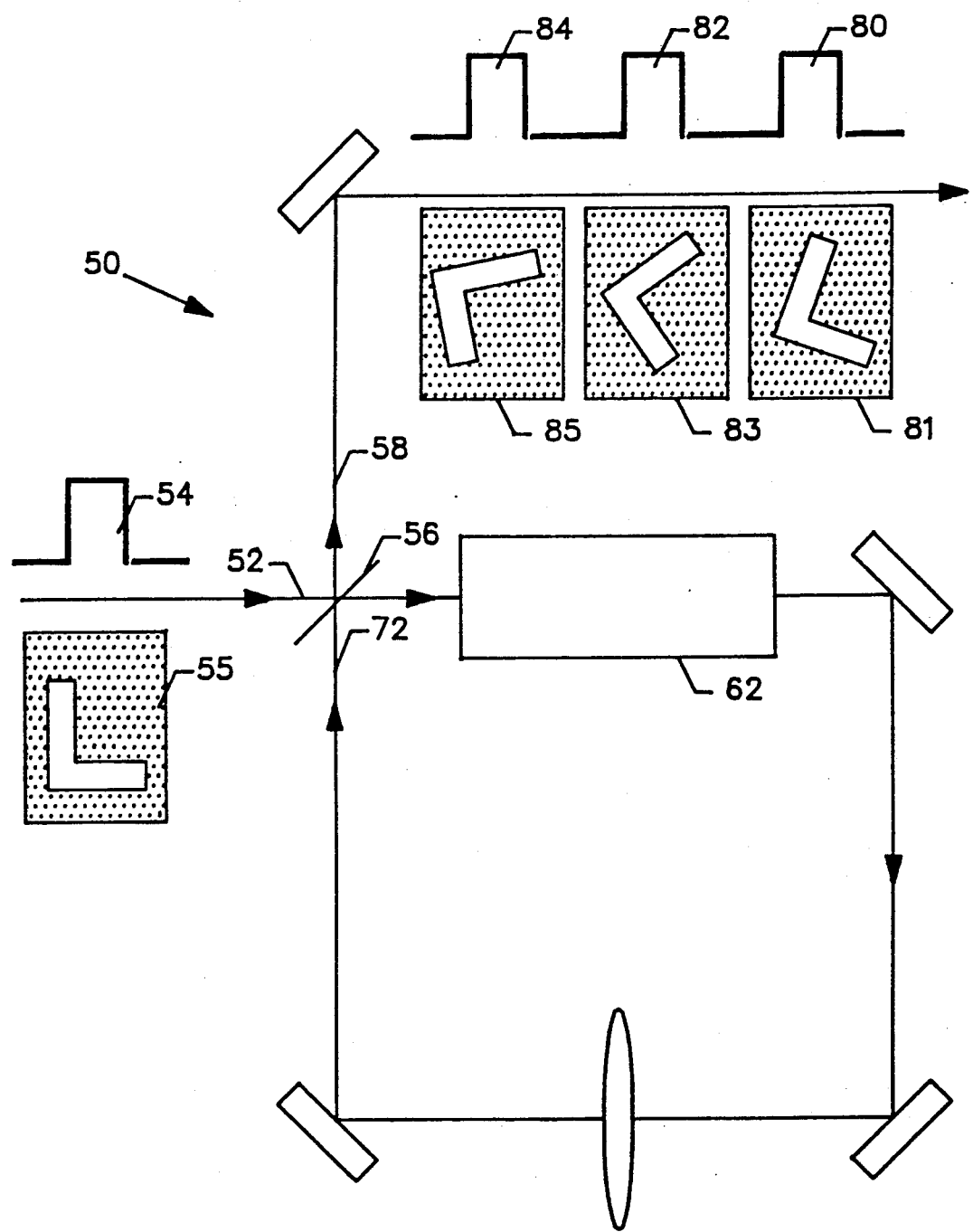
FIG. 2 is a schematic drawing of an optical ring resonator of the present invention for transforming the orientation of an input image.

Another embodiment of the present invention is illustrated in FIG. 2 and identified as ring resonator 50. Resonator 50 is identical to resonator 10 except that demagnifying system 22 is replaced by an image rotation system 62. A pulsed laser beam 52 has an input pulse 54 that carries an input image 55. Input pulse 54 is split by a beam splitter 56 into an output pulse 58 and a throughput pulse 60. Throughput pulse 60 is directed through an image rotation system 62 that changes the orientation of input image 55 by a predetermined angle of rotation. Image rotation system 62 may comprise, for example, a pair of dove prisms that rotate the input image by a given incremental angle. The rotated image is carried by pulse 72 to beam splitter 56 that provides a modified output pulse 80 and a modified throughput pulse for further image rotation. As this process repeats itself, resonator 50 generates a series of output pulses, such as pulses 80, 82, and 84, that carry successively rotated images, such as images 81, 83, and 85, respectively.

The transformed images generated by the present invention are not limited to those described above in conjunction with resonators 10 and 50. For example, lens system 22 of resonator 10 may comprise a magnifying system to generate a series of enlarged versions of input image 15. Also, the functions of resonators 10 and 50 may be combined in various ways to generate a matrix of output images successively modified in scale and orientation. In addition, the input image may be successively modified by other factors such as intensity or aspect angle.

After an input image is transformed into a series of images of various scales and orientations by the present invention, the transformed images can be directed into an optical Fourier system for correlation with stored reference image. Because the present invention generates a series of successively modified versions of the input image, only one version of each reference image must be stored by the image recognition system. One general scheme of invariant pattern recognition involves the use of the autocorrelation function as the feature of interest of an image. Rotation and scale information are preserved by this method because the autocorrelation function rotates and changes scale with the original image. The method is to first extract the autocorrelation function and then to extract rotation and scale invariant features from the autocorrelation. For rotation invariance, for example, circular harmonic expansions can be used so that the final step involves the matching of circular harmonic coefficient functions. The operations involving the computation of autocorrelation functions and the matching of images can be achieved using optical means. Furthermore, the system can be dynamically updated through the use of photorefractive crystals.

Although the present invention has been described with respect to several embodiments thereof, various changes and modifications may be suggested to one skilled in the art. Therefore, it is intended that the present invention encompass such changes and modifications as fall within the scope of the appended claims.

I claim:

1. A method of generating successive transformations of an optical image, comprising the steps of:
   receiving a laser beam input pulse carrying the optical image;
   splitting said input pulse into an output pulse and a throughput pulse;
   directing said throughput pulse through an optical ring resonator:
   optically transforming said throughput pulse into a modified pulse carrying a transformation of the optical image;
   splitting said modified pulse into a modified output pulse and a modified throughput pulse; and
   directing said modified throughput pulse and successive modifications thereof through said optical ring resonator to generate successive modifications of said modified output and throughput pulses, said successive modifications comprising successive transformations of the optical image.

2. The method of claim 1, wherein the step of optically transforming comprises modifying the optical image by a predetermined factor in scale.

3. The method of claim 1, wherein the step of optically transforming comprises rotating the optical image by a predetermined angle of rotation.

4. The method of claim 1, wherein the step of optically transforming comprises modifying the optical image by at least one of the factors of scale, orientation, aspect ratio, and intensity.

5. A method of optical image recognition, comprising the steps of:
   storing a single version of a reference image to be recognized;
   receiving a laser beam input pulse carrying an optical image;
   splitting said input pulse into an output pulse and a throughput pulse;
   directing said throughput pulse through an optical ring resonator;
   optically transforming said throughput pulse into a modified pulse carrying a transformation of said optical image;
   splitting said modified pulse into a modified output pulse and a modified throughput pulse;
   directing said modified throughput pulse and successive modifications thereof through said optical ring resonator to generate successive modifications of said modified output and throughput pulses, said successive modifications comprising successive transformations of said optical image;
   comparing said successive transformations of said optical image with said reference image; and
   generating a correlation peak when one of said transformations of said optical image matches said reference image.

6. The method of claim 5, wherein the step of optically transforming comprises modifying said optical image by a predetermined amount of at least one of the factors of scale, orientation, aspect ratio, and intensity.

7. The method of claim 5, further comprising the steps of:
   providing said successive modifications of said optical image in a series of output pulses equally spaced in time; and
   determining the amount of modification of the modified optical image that matches said reference image by noting the time at which said correlation peak occurs.

8. A method of optical image recognition, comprising the steps of:
   storing a single version of each of a plurality of reference images to be recognized;
   receiving a laser beam input pulse carrying an optical image;

splitting said input pulse into an output pulse and a throughput pulse;

directing said throughput pulse through an optical ring resonator;

optically transforming said throughput pulse into a modified pulse, said modified pulse comprising said optical image modified by a predetermined amount of at least one of the factors of scale, orientation, aspect ratio, and intensity;

splitting said modified pulse into a modified output pulse and a modified throughput pulse;

directing said modified throughput pulse and successive modifications thereof through said optical ring resonator to generate successive modifications of said modified output and throughput pulses, said successive modifications comprising successive modifications of said optical image;

comparing said successive modifications of said optical image with each of said reference images; and generating a correlation peak when one of said modifications of said optical image matches one of said reference images.

9. The method of claim 8, further comprising the steps of:

providing said successive modifications of said optical image in a series of output pulses equally spaced in time; and determining the amount of modification of the modified optical image that matches said one of said reference images by noting the time at which said correlation peak occurs.

* * * * *